United States Patent
Pan

(10) Patent No.: US 8,698,416 B2
(45) Date of Patent: Apr. 15, 2014

(54) CONTINUOUS DIMMING AC LED DEVICE

(71) Applicant: Luxul Technology Incorporation, Taipei (TW)

(72) Inventor: Cheng-Hung Pan, Taipei (TW)

(73) Assignee: Luxul Technology Incorporation, Taipei (TW)

( * ) Notice: Subject to any disclaimer, the term of this patent is extended or adjusted under 35 U.S.C. 154(b) by 60 days.

(21) Appl. No.: 13/645,889

(22) Filed: Oct. 5, 2012

(65) Prior Publication Data

US 2013/0099688 A1    Apr. 25, 2013

(30) Foreign Application Priority Data

Oct. 21, 2011 (TW) .............................. 100138235 A

(51) Int. Cl.
*H05B 41/36* (2006.01)

(52) U.S. Cl.
USPC ......... 315/291; 315/307; 315/308; 315/209 R

(58) Field of Classification Search
CPC ............... H05B 33/0815; H05B 37/02; H05B 33/0845; H05B 33/0833; H05B 33/0842; H05B 33/0851; H05B 33/0812; H05B 33/0884; H05B 41/2824
USPC .......... 315/185 R, 186, 193, 200 R, 201, 205, 315/209 R, 210, 224, 226, 291, 297, 299, 315/307, 308, 312, 313, 320, 362
See application file for complete search history.

(56) References Cited

U.S. PATENT DOCUMENTS

| | | | |
|---|---|---|---|
| 7,129,679 B2 * | 10/2006 | Inaba et al. | 323/222 |
| 8,044,609 B2 * | 10/2011 | Liu | 315/291 |
| 8,228,001 B2 * | 7/2012 | Fan | 315/291 |
| 8,384,311 B2 * | 2/2013 | Gray et al. | 315/307 |
| 2007/0267978 A1 * | 11/2007 | Shteynberg et al. | 315/247 |

* cited by examiner

*Primary Examiner* — Douglas W Owens
*Assistant Examiner* — Jianzi Chen
(74) *Attorney, Agent, or Firm* — Ming Chow; Sinorica, LLC

(57) ABSTRACT

A continuous dimming AC LED device is operated in association with a dimmer. When the dimmer adjusts brightness, the voltage supplied to the AC LED driver is reduced to decrease the brightness of an LED unit. When the supplied voltage is reduced to a working voltage required by the AC LED driver, a control unit detects the supplied voltage being lower than the working voltage. A control end of a voltage-controlled switch disconnects from the AC LED driver and connects to a power supply. Therefore, even the supply voltage is below the working voltage of the AC LED driver, the LED unit is prevented from being immediately turned off to maintain some brightness. With the dimmer, the brightness of the LED continuously and gradually changes from full brightness to darkness.

10 Claims, 3 Drawing Sheets

PRIOR
ART

US 8,698,416 B2

CONTINUOUS DIMMING AC LED DEVICE

BACKGROUND OF THE INVENTION

1. Field of the Invention

The invention relates to an AC LED device and, in particular, to a continuous dimming AC LED device.

2. Description of Related Art

The conventional illumination device usually installs a dimmer at the power supply end of a light bulb to control the conduction angle of a thyristor in the dimmer under an AC sinusoidal wave. This in turn controls the sinusoidal voltage passing through the light bulb, thereby making a continuous change in the brightness of the bulb. In other words, the sinusoidal wave voltage to the light bulb is larger when the conduction angle of the thyristor is larger than when the conduction angle is small. Thus, the light bulb is brighter in the former case. To reduce the brightness of the bulb, one reduces the thyristor conduction angle, providing a lower sinusoidal wave voltage to the bulb, so that its brightness is decreased.

If the dimmer is used on an LED bulb, wherein the LED bulb is formed by multiple LEDs connected in series or in parallel, a controller is used to adjust the brightness of the LED bulb. When the supply voltage of the dimmer is lower than the required working voltage of the controller, the controller fails to function so that the LED bulb turns off immediately. This is because the controller needs a constant working voltage to function and dim light. This makes the dimmer lose the effect of gradually dimming light. When the LED light bulb is equipped with the dimmer, the dimming range thereof is limited.

SUMMARY OF THE INVENTION

As described above, when a dimmer lowers the power supply voltage below a working voltage required by a controller, the controller cannot function and let the LED bulb go out immediately. The result is that the illumination device of LED bulbs has a limited dimming range. Thus, an objective of the invention is to provide a continuous dimming AC LED device that keeps using the original dimmer while enabling the LED bulb to continuously change its brightness from full brightness to darkness.

To achieve the above-mentioned objective, the disclosed continuous dimming AC LED device includes:

a rectifier for converting AC sinusoidal power into DC sinusoidal power and outputting the DC sinusoidal power from an anode and a cathode of the rectifier;

a low-voltage DC power generator having a power input terminal, a ground terminal and a power output terminal, wherein the power input terminal is connected to the anode of the rectifier and the ground terminal is connected to the cathode of the rectifier;

an LED unit having a first power terminal and a second power terminal, wherein the first power terminal is connected to the anode of the rectifier;

a voltage-controlled switch connected between the second power terminal of the LED unit and the cathode of the rectifier and having a control terminal;

a current detector connected between the voltage-controlled switch and the cathode of the rectifier and having an output terminal;

a switch having a first contact, a second contact, a common point and a control terminal, wherein the first contact is connected in series with a resistor and then to the anode of the rectifier, and the common point is connected to the control terminal of the voltage-controlled switch;

a control unit comprising a voltage detection terminal, an output terminal and a voltage detection unit, wherein the voltage detection unit is connected to the anode of the rectifier via the voltage detection terminal, and the output terminal is connected to the control terminal of the switch; and an AC LED driver having two power input terminals, an output terminal, and an input terminal, wherein the two power input terminals are electrically connected to the power output terminal and ground terminal of the low-voltage DC power generator, the output terminal of the AC LED driver is connected to the second contact of the switch, and the input terminal of the AC LED driver is connected to the output terminal of the current detector;

wherein the common point of the switch is connected to the output terminal of the AC LED driver via the second contact of the switch when a supply voltage applied to the AC LED driver is higher than a limit voltage, and the common point of the switch is alternatively connected to the anode of the rectifier via the first contact when the supply voltage applied to the AC LED driver is lower than the limit voltage.

A DC sinusoidal power is output from the rectifier. The current detector detects the current value of the LED unit. The AC LED driver drives the voltage-controlled switch via the switch, thereby ensuring the stability of light emission from the LED unit under a fixed current.

When the dimmer is used to adjust brightness, the dimmer directly reduces the supply voltage output from the rectifier, making the AC LED driver reduce the brightness of the LED unit due to the reduced supply voltage. When the supply voltage is reduced to a threshold working voltage of the AC LED driver, the control unit connected to the power supply terminal detects the reduced supply voltage and controls the switch to switch its contacts. The control terminal of the voltage-controlled switch changes from the original AC LED driver to the anode of the rectifier. Therefore, the LED unit is not immediately extinguished even though the voltage on the AC LED driver is lower than the working voltage. The LED unit continues to be bright and gradually dims with the dimmer. The invention can achieve the effect of continuous dimming from full brightness to darkness.

DETAILED DESCRIPTION OF THE PREFERRED EMBODIMENT

Figure 1:
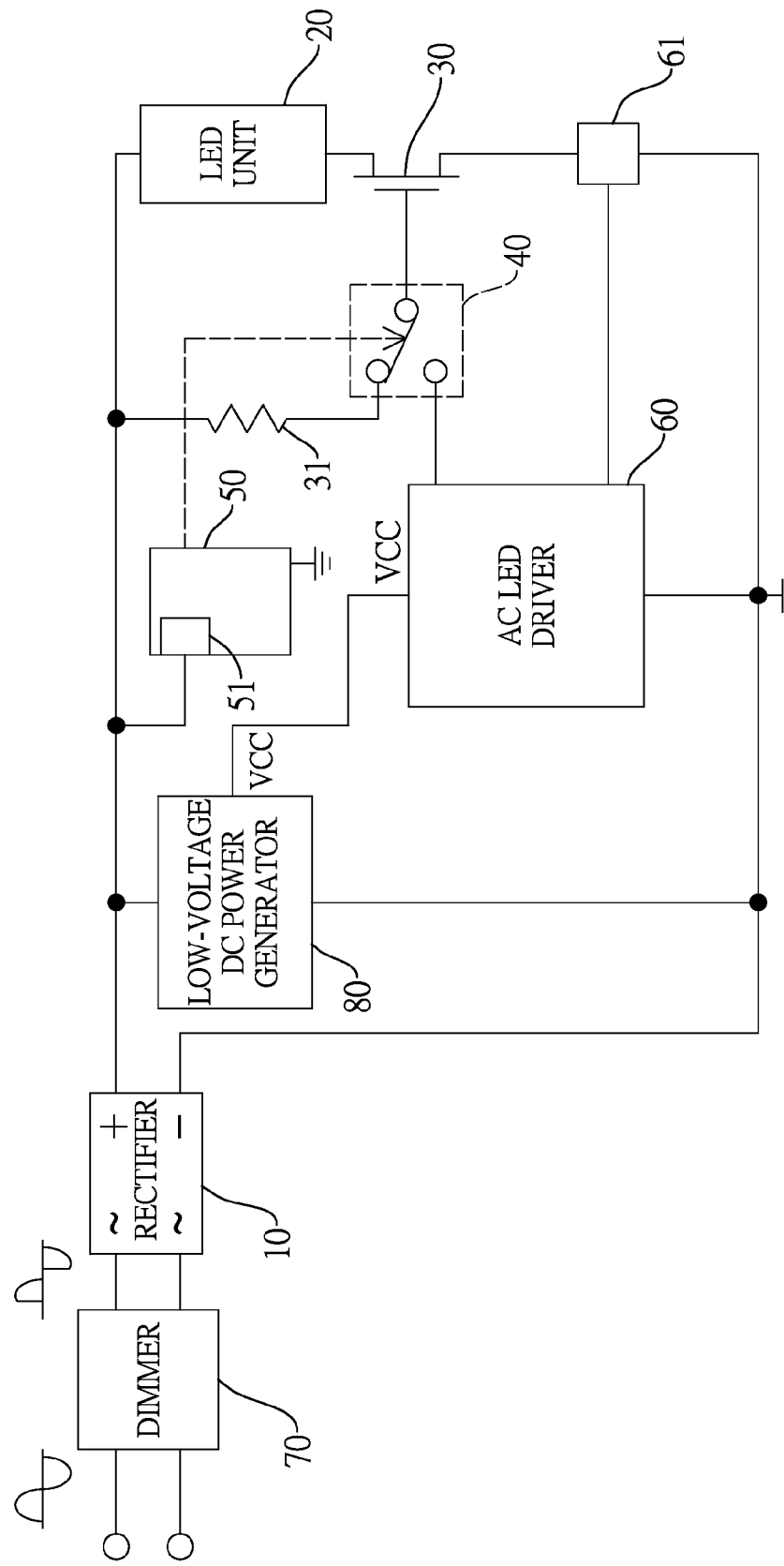
FIG. 1 is the circuit block diagram of a first embodiment of the invention.

With reference to FIG. 1, a first preferred embodiment of the invention comprises a rectifier 10, a low-voltage DC power generator 80, an LED unit 20, a voltage-controlled switch 30, a current detector 61, a switch 40, a control unit 50, and an AC LED driver 60.

The rectifier 10 converts an AC sinusoidal wave power to DC sinusoidal wave power. The DC sinusoidal wave power is output from an anode and a cathode of the rectifier 10.

The low-voltage DC power generator 80 has a power input terminal, a ground terminal, and a power output terminal. The power input terminal is connected to the anode of the rectifier 10. The ground terminal is connected to the cathode of the rectifier 10.

The LED unit 20 has a first power terminal and a second power terminal, and the first power terminal is connected to the anode of the rectifier 10.

The voltage-controlled switch 30 is connected between the second power terminal of the LED unit 20 and the cathode of the rectifier 10. The voltage-controlled switch 30 further has a control terminal to control the conduction thereof.

The current detector 61 is connected in series between the voltage-controlled switch 30 and the cathode of the rectifier 10 for detecting a current value of the LED unit 20 and outputting the detected current from an output terminal of the current detector 61.

The switch 40 has a first contact, a second contact, one common point and one control terminal. The first contact is connected in series with a resistor 31 and then to the anode of the rectifier 10. The common point is connected to the control terminal of the voltage-controlled switch 30. The control terminal of the switch 40 is used to control the common point to connect to either the first contact or the second contact.

The control unit 50 has a voltage detection terminal and an output terminal. The voltage detection terminal is connected to the anode of the rectifier 10. A voltage detection unit 51 is provided in the control unit 50 and connects to the voltage detection terminal. The output terminal is connected to the control terminal of the switch 40.

The AC LED driver 60 has two power input terminals, one output terminal, and one input terminal. The two power input terminals are respectively connected to the power output terminal and the ground terminal of the low-voltage DC power generator 80. The output terminal of the AC LED driver 60 connects to the second contact of the switch 40 for connecting to the control terminal of the voltage-controlled switch 30 via the common point when the common point is in connection with the second contact. The input terminal of the AC LED driver 60 connects to the output terminal of the current detector 61.

Figure 2A:
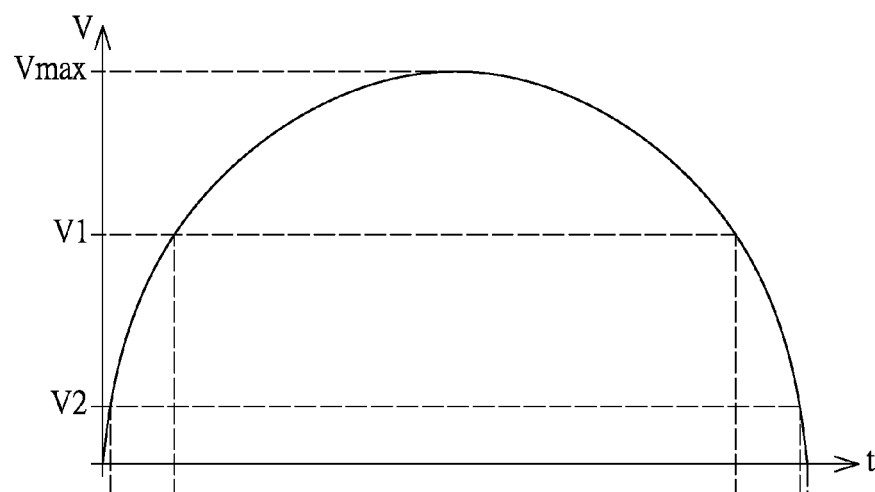
FIG. 2A shows the power supply voltage waveform of the invention.

With reference to FIG. 2A, the rectifier 10 outputs the DC sinusoidal wave power, hereinafter the supply voltage. When the voltage detection unit 51 connected to the anode of the rectifier 10 detects that the supply voltage (Vmax) is greater than a limit voltage (V1) required by the AC LED driver 60, the control unit 50 controls the switch 40 to switch its contact position, so that the control terminal of the voltage-controlled switch 30 connects to the output terminal of the AC LED driver 60. The current detector 61 is used to detect the current value of the LED unit 20, thereby enabling the AC LED driver 60 to drive the voltage-controlled switch 30 and controlling the average current of the LED unit 20.

Figure 2B:
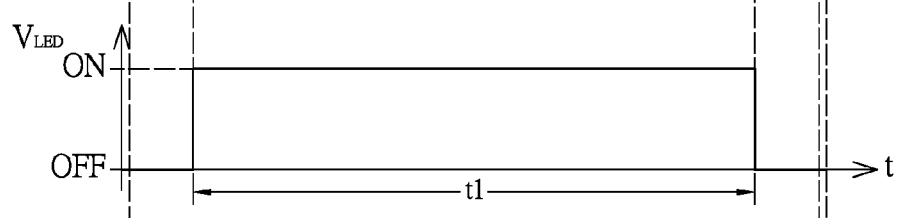
FIG. 2B shows the voltage waveform on the LED unit driven by a conventional AC LED driver.

When a dimmer 70 is provided between the AC sinusoidal wave power supply and the rectifier 10, the dimmer 70 reduces the supply voltage to the rectifier 10. The AC LED driver 60 thus reduces the brightness of the LED unit 20 due to the reduced supply voltage. As shown in FIG. 2B, if the power supply voltage drops below the limit voltage (V1), wherein the limit voltage is the minimum voltage for maintaining the working voltage of the AC LED driver 60, and the voltage-controlled switch 30 is only connected to the AC LED driver 60, the AC LED driver 60 does not have sufficient working voltage to drive the voltage-controlled switch 30 so that the LED unit 20 is off. Therefore, the lighting time of the LED unit 20 is only maintained to be t1.

Figure 2C:
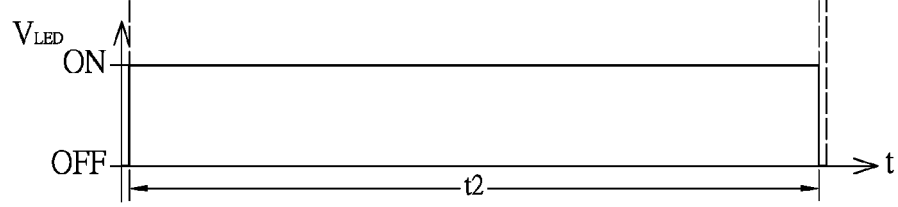
FIG. 2C shows the voltage waveform on the LED unit driven by the AC LED driver of the present invention.

However, according to the present invention, since the voltage detection unit 51 in the control unit 50 detects the variation in the supply voltage and controls the switch to switch the contact position before the AC LED driver 60 has no sufficient working voltage, the control terminal of the voltage-controlled switch 30 switches away from the output terminal of the AC LED driver 60 and connects to the anode of the rectifier 10, thereby the voltage-controlled switch 30 directly obtaining the supply voltage from the rectifier 10. As shown in FIG. 2C, even the AC LED driver 60 does not obtain sufficient working voltage for operations, i.e. below the limit voltage (V1), the LED unit 20 still continues to light up until the supply voltage is further below a threshold voltage (V2) of the LED unit 20. In that case, the LED unit 20 turns off. Consequently, the lighting time of the LED unit 20 is extended to t2, which is longer than t1. If t2 is closer to one complete cycle of the power supply voltage, the continuous dimming range of the dimmer 70 can be further increased.

Figure 3:
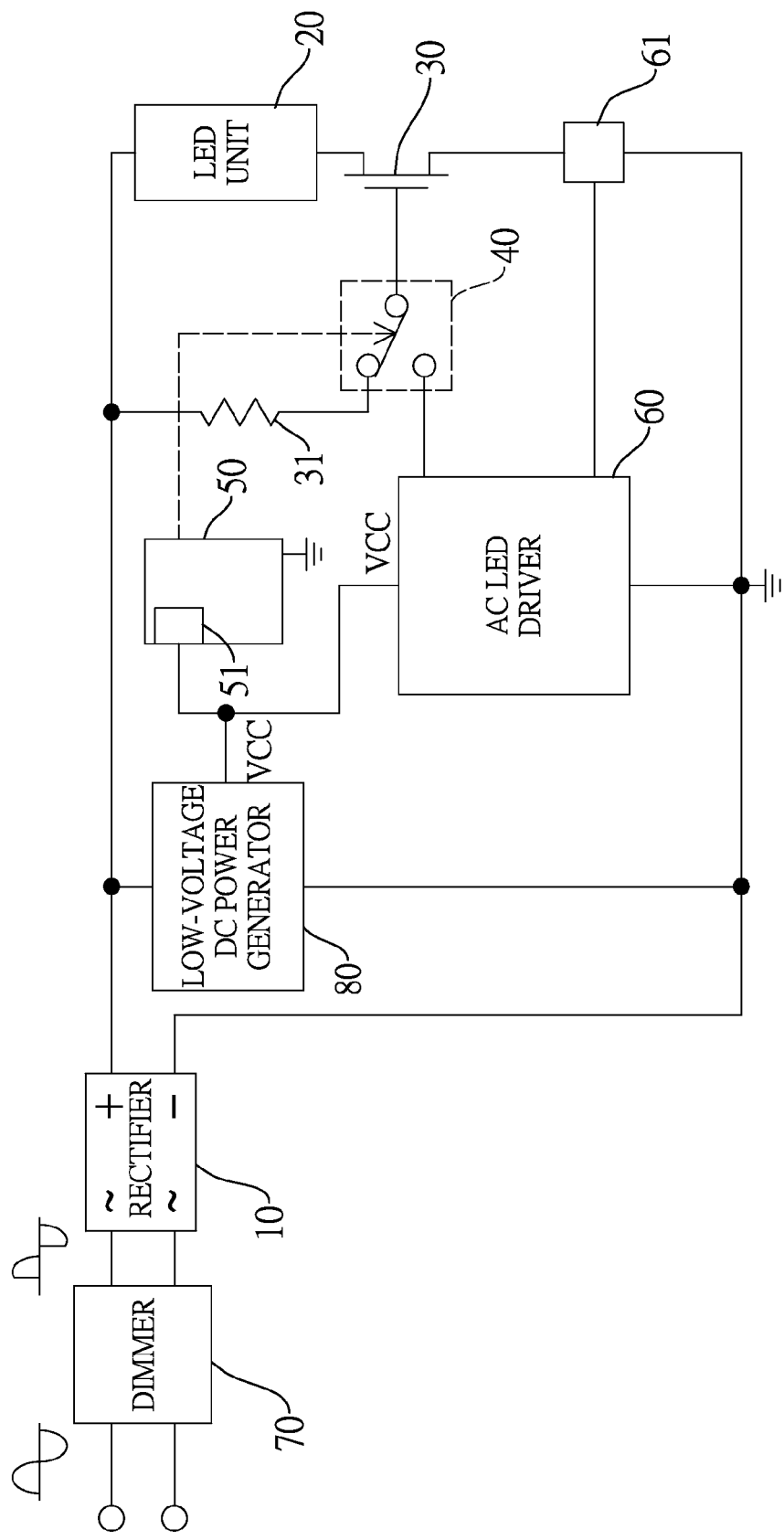
FIG. 3 is a circuit block diagram of a second embodiment of the invention.

A second embodiment of the invention is shown in FIG. 3. The voltage detection terminal of the control unit 50 is connected to the power output terminal of the low-voltage DC power generator 80 for detecting the DC voltage (VCC) output from the low-voltage DC power generator 80. When the DC voltage (VCC) is lower than the limit voltage (V1) required by the AC LED driver 60, the control unit 50 controls the switch 40 to change the contact position. The control terminal of the voltage-controlled switch 30 then connects to the anode of the rectifier 10 to directly receive the supply voltage. This feature achieves the effect of continuous lighting at low voltages.

In summary, by switching the control terminal of the voltage-controlled switch 30, the invention removes the restriction of the working voltage of the AC LED driver 60 on the LED unit 20. The invention further increases the dimming range to achieve the purpose of continuous dimming using the dimmer 70.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A continuous dimming AC LED device, comprising:
    a rectifier for converting AC sinusoidal power into DC sinusoidal power and outputting the DC sinusoidal power from an anode and a cathode of the rectifier;
    a low-voltage DC power generator having a power input terminal, a ground terminal and a power output terminal, wherein the power input terminal is connected to the anode of the rectifier and the ground terminal is connected to the cathode of the rectifier;
    an LED unit having a first power terminal and a second power terminal, wherein the first power terminal is connected to the anode of the rectifier;
    a voltage-controlled switch connected between the second power terminal of the LED unit and the cathode of the rectifier and having a control terminal;
    a current detector connected between the voltage-controlled switch and the cathode of the rectifier and having an output terminal;
    a switch having a first contact, a second contact, a common point and a control terminal, wherein the first contact is connected in series with a resistor and then to the anode of the rectifier, and the common point is connected to the control terminal of the voltage-controlled switch;

a control unit comprising a voltage detection terminal, an output terminal and a voltage detection unit, wherein the voltage detection unit is connected to the anode of the rectifier via the voltage detection terminal, and the output terminal is connected to the control terminal of the switch; and an AC LED driver having two power input terminals, an output terminal, and an input terminal, wherein the two power input terminals are electrically connected to the power output terminal and ground terminal of the low-voltage DC power generator, the output terminal of the AC LED driver is connected to the second contact of the switch, and the input terminal of the AC LED driver is connected to the output terminal of the current detector;

wherein the common point of the switch is connected to the output terminal of the AC LED driver via the second contact of the switch when a supply voltage applied to the AC LED driver is higher than a limit voltage, and the common point of the switch is alternatively connected to the anode of the rectifier via the first contact when the supply voltage applied to the AC LED driver is lower than the limit voltage.

2. The continuous dimming AC LED device as claimed in claim 1, wherein the rectifier is a full-wave rectifier.

3. The continuous dimming AC LED device as claimed in claim 2, wherein the voltage-controlled transistor is a metal oxide semiconductor (MOS) field effect transistor (FET) whose source connects to the cathode of the rectifier, whose drain connects to the other power terminal of the LED unit, and whose gate functions as the control terminal and connects to the common point of the switch.

4. The continuous dimming AC LED device as claimed in claim 1, wherein the voltage-controlled transistor is a metal oxide semiconductor (MOS) field effect transistor (FET) whose source connects to the cathode of the rectifier, whose drain connects to the other power terminal of the LED unit, and whose gate functions as the control terminal and connects to the common point of the switch.

5. The continuous dimming AC LED device as claimed in claim 1, wherein the limit voltage is a minimum voltage for maintaining the operation of the AC LED driver.

6. A continuous dimming AC LED device, comprising:
a rectifier for converting AC sinusoidal power into DC sinusoidal power and outputting the DC sinusoidal power from an anode and a cathode of the rectifier;
a low-voltage DC power generator having a power input terminal, a ground terminal and a power output terminal, wherein the power input terminal is connected to the anode of the rectifier and the ground terminal is connected to the cathode of the rectifier;
an LED unit having a first power terminal and a second power terminal, wherein the first power terminal is connected to the anode of the rectifier;
a voltage-controlled switch connected between the second power terminal of the LED unit and the cathode of the rectifier and having a control terminal;
a current detector connected between the voltage-controlled switch and the cathode of the rectifier and having an output terminal;
a switch having a first contact, a second contact, a common point, and a control terminal, wherein the first contact is connected in series with a resistor and then to the anode of the rectifier, and the common point is connected to the control terminal of the voltage-controlled switch;
a control unit comprising a voltage detection terminal, an output terminal and a voltage detection unit, wherein the voltage detection unit is connected to the power output terminal of the low-voltage DC power generator via the voltage detection terminal, and the output terminal is connected to the control terminal of the switch; and
an AC LED driver having two power input terminals, an output terminal, and an input terminal, wherein the two power input terminals are electrically connected to the power output terminal and ground terminal of the low-voltage DC power generator, the output terminal of the AC LED driver is connected to the second contact of the switch, and the input terminal of the AC LED driver is connected to the output terminal of the current detector;
wherein the common point of the switch is connected to the output terminal of the AC LED driver via the second contact of the switch when a supply voltage applied to the AC LED driver is higher than a limit voltage, and the common point of the switch is alternatively connected to the anode of the rectifier via the first contact when the supply voltage applied to the AC LED driver is lower than the limit voltage.

7. The continuous dimming AC LED device as claimed in claim 6, wherein the rectifier is a full-wave rectifier.

8. The continuous dimming AC LED device as claimed in claim 7, wherein the voltage-controlled transistor is a metal oxide semiconductor (MOS) field effect transistor (FET) whose source connects to the cathode of the rectifier, whose drain connects to the other power terminal of the LED unit, and whose gate functions as the control terminal and connects to the common point of the switch.

9. The continuous dimming AC LED device as claimed in claim 6, wherein the voltage-controlled transistor is a metal oxide semiconductor (MOS) field effect transistor (FET) whose source connects to the cathode of the rectifier, whose drain connects to the other power terminal of the LED unit, and whose gate functions as the control terminal and connects to the common point of the switch.

10. The continuous dimming AC LED device as claimed in claim 6, wherein the limit voltage is a minimum voltage for maintaining the operation of the AC LED driver.

\* \* \* \* \*